United States Patent
Bernard

[15] 3,637,912
[45] Jan. 25, 1972

[54] FURNACE FOR GLASS PROCESSES

[72] Inventor: Claude E. Bernard, Neuilly-sur-Seine, France

[73] Assignee: Compagnie De Saint-Gobain-Pont-A-Mousson, Neuilly-sur-Seine, France

[22] Filed: Apr. 2, 1970

[21] Appl. No.: 25,172

[30] Foreign Application Priority Data
Apr. 3, 1969  France...................................6910300

[52] U.S. Cl..............................................13/6, 13/20, 263/3
[51] Int. Cl...........................................................F27b 9/28
[58] Field of Search..............13/6, 31, 35, 20, 22; 263/6, 263/3, 28, 46

[56] References Cited

UNITED STATES PATENTS 3,511,483  5/1970  Gentry......................................263/6
2,618,671  11/1952  Van der Pyl..............................13/20

Primary Examiner—Bernard A. Gilheany
Assistant Examiner—R. N. Envall, Jr.
Attorney—Dale A. Bauer, John L. Seymour and Bauer and Seymour

[57] ABSTRACT

A tunnel furnace comprising a floor, sides, and a vault composed of refractory material, the vault being comprised of independently movable sections suspended from carriage means aligned transversely to the longitudinal axis of the furnace whereby each section may be removed independently from the furnace, each sec movable section of the vault comprising refractory walls and a floor suspended from the carriage means and constituting a bin adapted to the reception of refractory, heat-retaining material.

21 Claims, 5 Drawing Figures

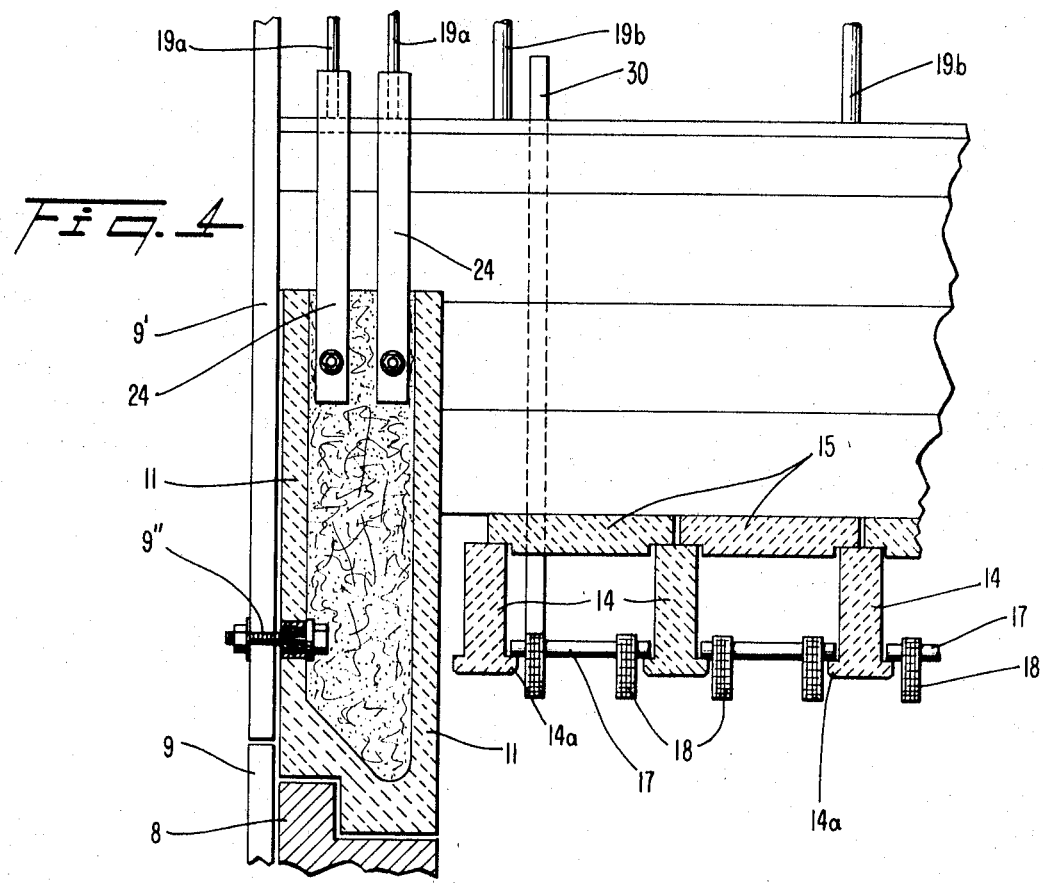
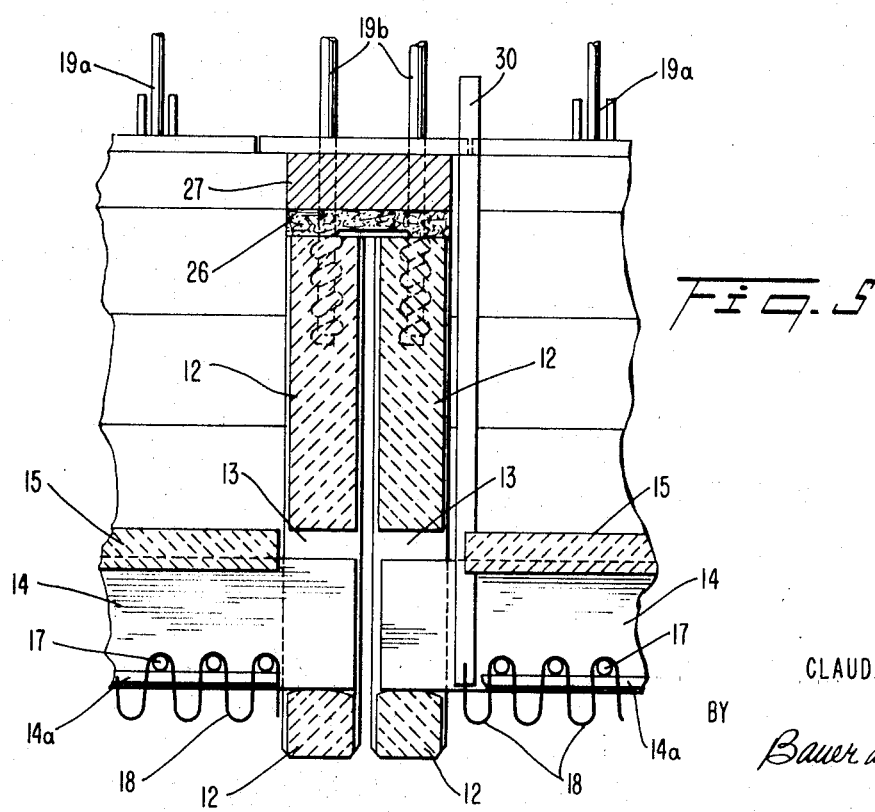

FURNACE FOR GLASS PROCESSES

This invention relates to furnaces of the type called tunnel furnaces. Such furnaces have wide utility, for instance in the heating of flat glass in ribbon or sheet form. Such furnaces are mounted for example at the head end of an apparatus for bending windshields to the proper contour or for tempering of flat glass. Such furnaces usually are provided with a conveyor to support the glass horizontally and with heaters above and below the glass to raise its temperature to a point such that its viscosity is right for the process which is to be applied to it. We will assume for the purpose of describing this novel furnace that it is mounted at the head end of a tempering line which involves the feeding of the glass sheets to the furnace, their heating in the furnace to about softening temperature, their tempering by blasts of air or otherwise, and their cooling and removal from the line. Heretofore such furnaces have had rectangular tunnels bounded by the floor of the furnace, its sides, and the vault, all of which are composed of suitable refractory material the nature of which is known to persons skilled in the art. The vaults have frequently been composed of cast refractory constituting a unit with the sides of the furnace once they are in position. Such furnaces are subject to wear and to damage from various causes, and their repair and reconstruction has been excessively difficult not only as an operation, but as requiring the cessation of furnace operation during the cooling down, the repairing, and the reheating.

It is an object of this invention to construct tunnel furnaces so that the making of repairs does not require the termination of the process, so that repairs can be made while the furnace is in full operation, and so that the ultimate efficiency of the furnace in operation can be maintained at its highest level. It is also an object to construct tunnel furnaces rapidly, of standard parts, to dimensions ideal for the work intended.

It is well known that the articles which are to be heated in these furnaces have dimensions which vary greatly, for example from thick glass doors to thin glass sheets which are to be used as television screens. The efficiency of a furnace so large as to heat doors is low when it is employed to heat small pieces of glass. It is accordingly desirable to have a furnace which can be readily reconstructed so as to maintain maximum efficiency upon any size of glass article. It is accordingly an object of the invention to reduce the cost of constructing such furnaces so that a furnace can be assembled from standard components in whatever dimensions are desired either laterally or longitudinally.

The objects of the invention are accomplished generally speaking by a heating furnace having a bed, sides, and a vault forming a tunnel for the passage of flat glass, means to support flat glass on its passage through the tunnel, means to heat the flat glass from above and from below, said vault comprising a plurality of hollow sections arranged end to end, and heat insulating means stored in the hollow of the sections.

The invention involves a tunnel furnace which has a suspended vault formed of independent, hollow rectangular bodies disposed end to end longitudinally of the furnace, each section being comprised of a hollow body of which the walls and floor are formed of refractory plates of standard dimensions of which a sufficient number are chosen to enclose the whole area which is needed for the operation in contemplation. There is also novelty in the construction of the base of the furnace which supports the sides and vault during the operation of the furnace. As all of the elements of the vault are of a standardized type, it is simple to assemble the sections into a furnace of the dimensions required or, when necessary, to replace their elements without interrupting the operation of the furnace.

A preferred form of the invention is illustrated in the accompanying drawings, wherein:

FIGS. 4 and 5 are views in detail on a larger scale but analogous in subject matter to FIGS. 2 and 3.

Figure 3:
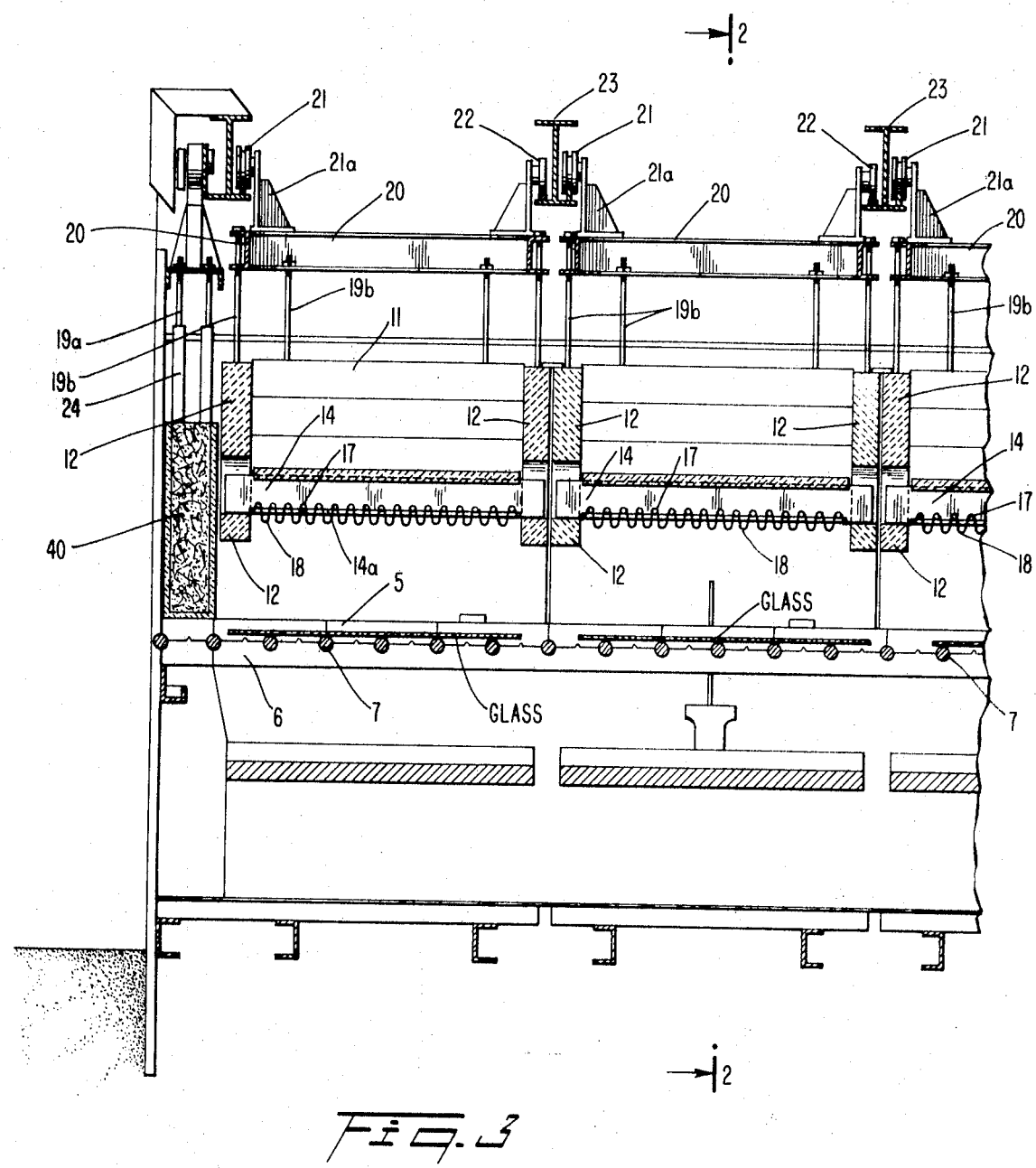
FIG. 3 is a longitudinal section on the line 3—3 of FIG. 2.

In this form of the invention the lateral walls of the section may be suspended from a metal frame which has wheels mounted on rails extending across the furnace and constituting a carriage rollably supporting the section of the vault. The vault itself is divided into a number of sections as shown in FIG. 3, which are mounted end to end along the path of the glass and each section is thus capable of being removed independently without disturbing the operation of the furnace. The heating means is mounted in the bottom of the section floor and will be independently operable and capable of disconnection from the power supply without disturbing the operation of the heaters supported by the other sections.

Figure 1:
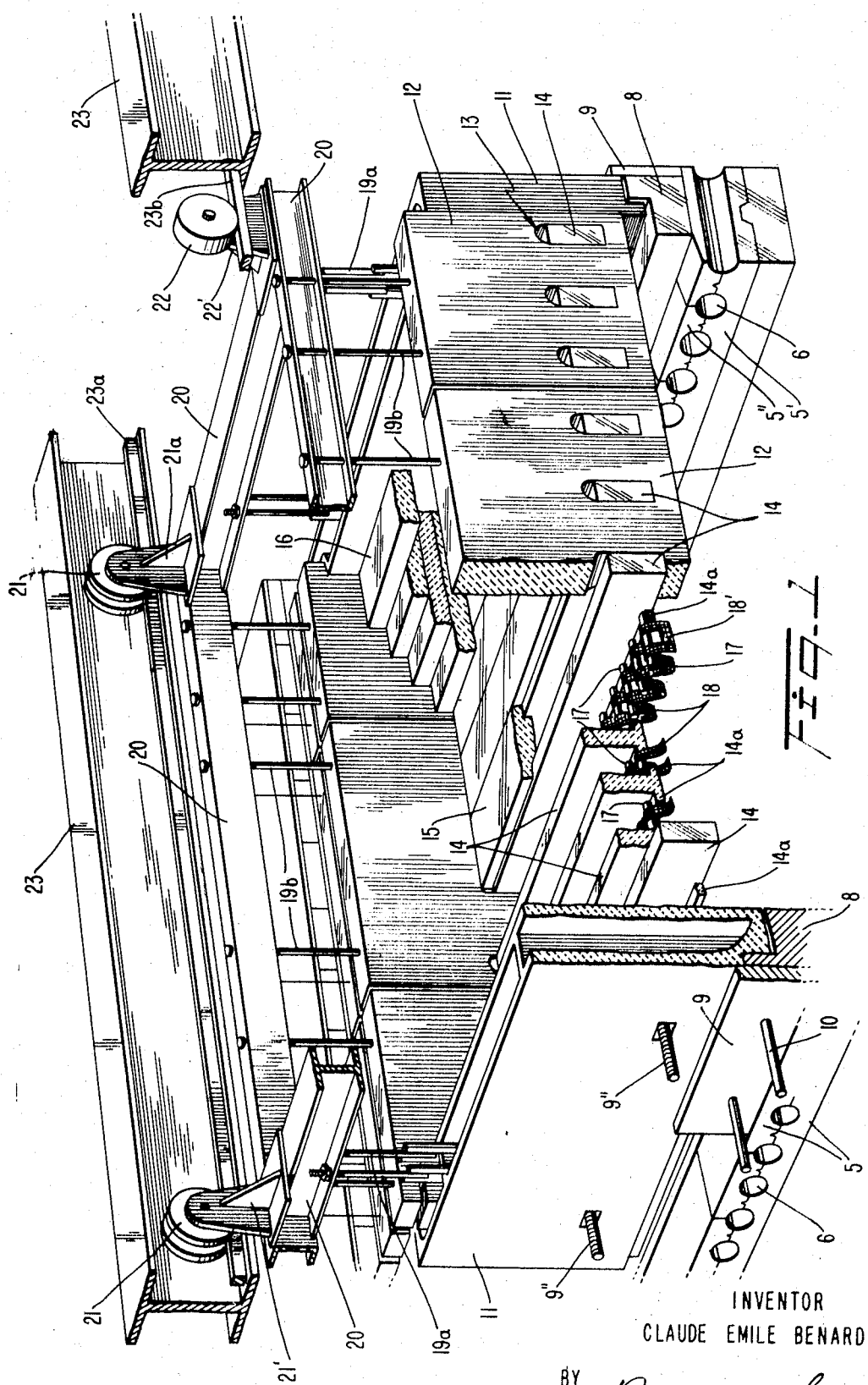
FIG. 1 is a perspective view sectioned and deleted of parts to illustrate the general novelty of the construction.
Figure 2:
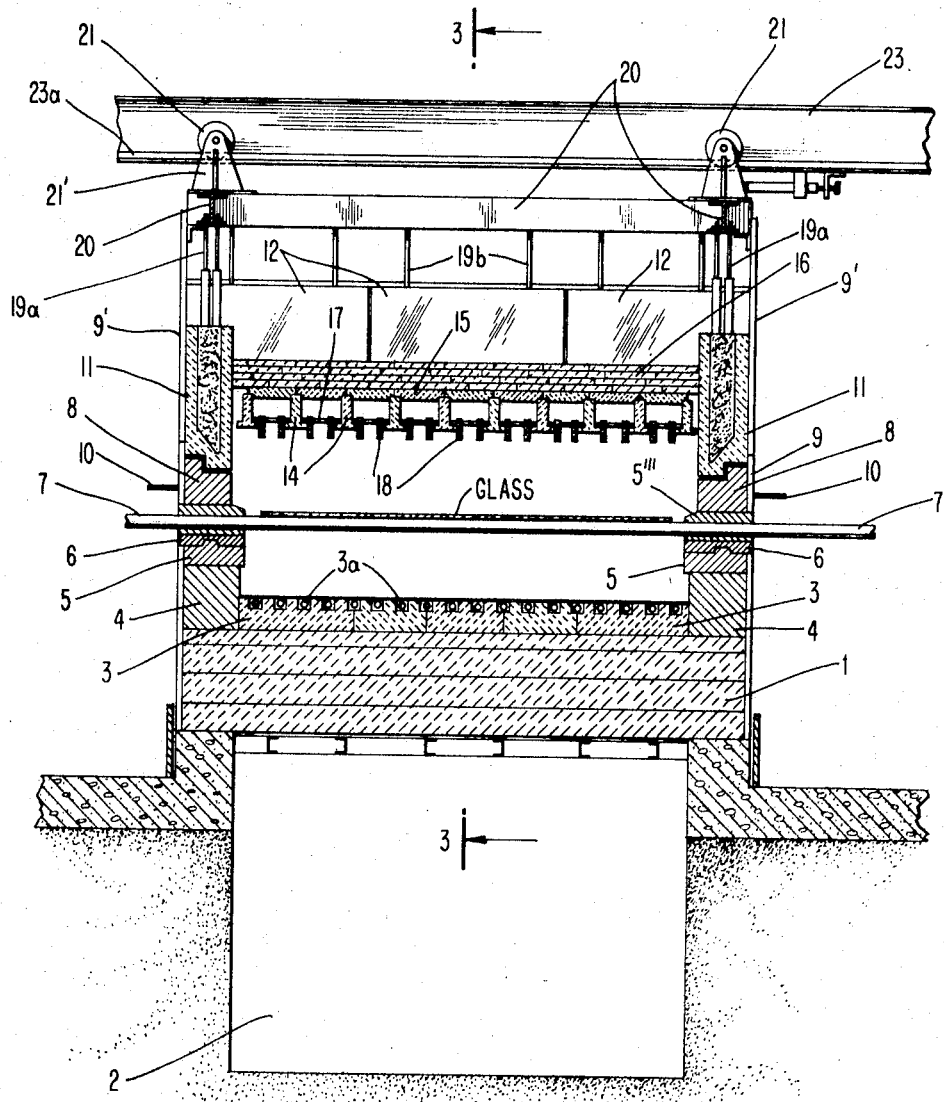
FIG. 2 is a cross section on the line 2—2 of FIG. 3.

Referring now to the numerals of the drawings:

The base 1 of the furnace is constructed of a refractory material according to known principles. Refractory balks 4 of standard sizes are placed end to end along the sides of the floor 1. Between the balks are refractory paving blocks 3 having longitudinally extending grooves in the surfaces within which the lower heating elements 3a are placed. Upon the longitudinals 4 are placed refractory stringers 5 which hold in horizontal alignment a plurality of bearings 6 within which turn the rollers 7 which support the rollers. The rollers may be idlers or may be driven. The blocks 5 are composed of lower sections 5′ and upper removable cap sections 5″ (FIG. 1). The means by which they are held together is ordinary and is not shown. Upon the bearing blocks 5 are longitudinally extending stringers 8 which are cast refractory and have upper surfaces at two levels as shown in FIG. 2. Above the refractory longitudinals 8 are hollow side pieces 11 (FIGS. 1 and 2) which have lower surfaces which match the upper surfaces of the longitudinals 8. The side pieces 11 are made of hollow cast refractory material forming a kind of well which can be filled with loose insulation of any chosen type and made in any selected standard size.

A rectangular frame 20 of metal is suspended by wheels 21, 22 and brackets 21′, 22′ from rails 23a and 23b which are carried by the lower flanges of I beams 23 which are supported from the ground. The wheels 21 on one side are tongue and groove with the rail 23a and on the other side flat with the rail 23b which allows for change in dimension under heat without binding. The transverse walls of the section are composed of a plurality of standardized panels 12 of refractory material within which openings 13 have been made to provide for the reception of the floor beams 14, the beams being loosely mounted to permit change of dimension with change in temperature. The sections 12 are suspended from frame 20 by bolts 19b as the side sections 11 are suspended by bolts 19a. The details of this method of suspension is shown in FIGS. 4 and 5.

The floor beams 14 have laterally extending flanges 14a upon which rests pin 17 (FIG. 4) over which are draped (FIGS. 1 and 5) flexible strips of electrical resistance. The resistances are supplied at either end by lines 30 which are attached to a suitable source of current. The resistances are shown as parallel strands 18 joined at each end by a connecting bridge 18′, FIG. 1. Other forms of resistance can be employed as indicated, for example, at 3a in FIG. 2, appropriate structural change being made in the standard element to furnish the necessary support. Each section may be covered on the outside with refractory metal plates 9, 9′ (FIG. 4) which are affixed to the stringer or longitudinal 8 and hollow side pieces 11 by means of bolts 9″, which are illustrated in FIG. 1.

Looking at FIG. 2, the piece of glass will be put into the furnace onto the rollers 7 and will travel along it between the heaters 3a and 18, the input of energy being such as to bring both faces of the sheet to the selected temperature before the sheet leaves the furnace.

Returning to FIG. 1, the beams 14 are covered with flooring 15 which is composed of standard planks, the lower longitudinal edges of which are cut sway to provide horizontal flanges and vertical abutments. The planks are of such size as to prevent detritus from falling through while allowing for expansion under heat. There is thus constructed a hollow section having a floor and sidewalls all of which are suspended from a carriage and being capable of being moved out of the production line as a unit. The maximum retention of heat and furnace efficiency is attained by filling the hollow or bin formed by and between the walls and floor with slabs of insulation 16, which may be piled to any selected depth and thus be made to achieve whatever degree of heat retention is desired. There is thus provided a control of the radiation from the vault in operations involving small levels of heat. The amount of insulation mounted in the section may be small, being increased as desired when the operations of the furnace become thermally more intense. In removing a section from the furnace the side pieces 9 will be removed by means of the grips 10; the pieces 8, which are slidably mounted on the longitudinals 5 can then be removed independently or as a part of the operation of removing the metal panels 9, and the entire section can be wheeled away below its carriage. Assuming that the repair of the section is necessary, another section can be made up in advance and emplaced immediately after the removal, the entire operation taking very little time and the operation of the furnace being interrupted not at all.

By making the bolts 19a and 19b vertically adjustable as indicated in FIGS. 4 and 5 the level of the sections with respect to the position of the glass can be changed at will, thus achieving a maximum of efficiency.

The openings at the head and discharge ends of the furnace can be protected with pieces 40 which are similar to side pieces 11 of the sections, being hollow and receiving loose insulation, and being suspended from a carriage.

The advantages of this invention are numerous. It is believed to be the first furnace having a vault constructed in sections which are readily removed from the furnace for repair and replacement without interrupting the operation of the furnace. The efficiency of the vault in retaining heat can be changed at will to accommodate heating operations of different intensity. Because each section has its own heating controls, the temperature beneath each section of the vault can be changed at will. The total construction is refractory, in most cases preferably refractory cast in standard sizes which can be assembled in any chosen dimensions. The construction of such furnaces is easy and cheap compared to the cost of constructing prior furnaces. Furnaces can be constructed of those dimensions which are best adapted to the work at hand.

As many apparently widely different embodiments of the present invention may be made without departing from he spirit and scope thereof, it is to be understood that the invention is not limited to the specific embodiments.

What is claimed is:

1. A furnace adapted to the heating of flat objects such as flat glass, comprising, a plurality of hollow units mounted in end to end contiguous relation in a horizontal line longitudinally of the furnace to thereby conjointly form a heating tunnel, and carriage means mounting each said unit for horizontal translation out of and transversely of said line, independently of the other said units.

2. A tunnel furnace comprising a floor, sides, and a vault composed of refractory material, said vault comprising a plurality of sections, carriage means suspending each said section for independent movement from a first position in alignment with the longitudinal axis of the furnace to a second position transversely out of alignment with said longitudinal axis, each said section of the vault comprising refractory side and end walls and a floor, said walls and floor conjointly constituting a bin for the reception of refractory, heat retaining material.

3. A tunnel furnace having a suspended vault formed of independent sections disposed end to end longitudinally of the furnace, each said section being composed of a bin of which the transverse walls are formed of a plurality of refractory plates of standard dimensions in sufficient number to extend across the furnace, the sidewalls of each bin being contiguous to its transverse walls and forming an enclosure therewith, floor means extending between the side and transverse walls of each said bin, below the top edges thereof, and independently operable electric heating elements mounted below said floor means of each said section.

4. Apparatus according to claim 3 in which each bin is filled with refractory material.

5. The apparatus of claim 1, said carriage means comprising a frame suspended from wheels running on rails disposed horizontally transversely to said horizontal line, and side and end walls suspended from said frame to conjointly form an enclosure for each respective unit.

6. The apparatus of claim 5, each said end wall having a plurality of apertures spaced horizontally therein, each aperture in one wall forming a pair with a corresponding aperture in the opposite wall, a plurality of beans each having its ends in and supported by a respective pair of apertures in said walls, and a floor supported by said beams.

7. The apparatus of claim 2, said sides of the tunnel furnace including a top layer of removable stringer elements having their upper surfaces longitudinally rabbetted, the lower surface of said refractory sidewalls being complementarily rabbetted longitudinally, to interfit with said layer of stingers and form a seal therewith, said stringer elements being removable outwardly from the furnace, to free the corresponding unit for ready removal and withdrawal of the section from the aligned units forming the furnace.

8. In a heating furnace, a base, sidewalls, and a vault conjointly forming a tunnel having a longitudinal axis, means within said tunnel to support flat glass for movement longitudinally in and along the tunnel, means within the tunnel for heating the flat glass from above and from below, said vault comprising a plurality of discrete sections disposed in end-to-end relation, each said section forming a respective one of a plurality of bins, and a selected quantity of heat insulating material stored in each said bin.

9. The furnace of claim 8, and means mounting each said section for translation in a direction transversely to the longitudinal axis of the furnace.

10. The furnace of claim 8, the vault of each said section comprising a plurality of laterally spaced, longitudinally extending beams, electrical heating means, means conjointly carried by said beams and supporting said electrical heating means over and in heat-exchange relation with flat glass passing through said tunnel.

11. A glass heating furnace comprising, a base, sidewalls, and a vault, said base, walls and vault collectively constituting a tunnel having a longitudinal axis, said vault comprising a plurality of discrete hollow sections in end-to-end contiguous relation along said axis, heat insulation material in and supported by the hollow of each said section, and means mounting each said section for horizontal movement transversely of said longitudinal axis, independently of the remaining said sections 12. The furnace of claim 10, said electrical heating means of each said section being energizable independently of the electrical heating means of the other said sections.

13. The furnace of claim 11, each said vault comprising a floor, side, and end walls collectively forming a compartment independently of the remaining sections, and a selected quantity of heat insulating material disposed in each said compartment and supported on and by the floor thereof.

14. The furnace of claim 13, said heat insulating material consisting of a multiplicity of flat slabs of refractory material stacked to a selected depth on the floor of each said compartment, between the walls thereof.

15. In a tunnel type heating furnace, a base, sides extending upwardly from and along the side edges of said base, a vault supported on and by said sides and forming with said sides and base, a tunnel having a longitudinal axis along which material to be heated is moved in said tunnel, said vault comprising a plurality of discrete sections disposed in end-to-end contiguous relation along said axis, each said section comprising sidewalls, end walls and a floor conjointly forming a compartment for heat insulating material, each said end wall comprising a plurality of panels with vertical edges in contact, frame means above each said section, bolt means carried by said frame means and removable supporting each said panel and said sidewalls.

16. The furnace of claim 15, each said panel being apertured at and along its lower edges, each aperture in one panel forming a pair with a corresponding aperture in a panel of the opposite end wall, a plurality of beams each having its ends in and removably supported by a respective pair of apertures, and a plurality of planks supported by said beams in side-by-side edge-contacting relation.

17. The furnace of claim 16, a multiplicity of pins supported by and from said beams along and adjacent the lower edges thereof, and electrical resistance heating strips removably extending over and supported by said pins.

18. The furnace of claim 16, spacer blocks removably interposed between the upper edges of said sides and the lower edges of said sidewalls, and forming a seal therewith, and means mounting each said section for horizontal translation in a direction normal to said longitudinal axis, independently of each of the remaining sections.

19. The apparatus of claim 6, said floor comprising a plurality of sections each having rabbetted side edges defining longitudinally extending downward projections each fitting between a consecutive pair of said beams.

20. The apparatus of claim 6, each said beam having a pair of flanges oppositely projecting horizontally from its lower edge, a multiplicity of pins each having its ends resting on and removably supported by the flanges of a consecutive pair of said beams, and electrical heating means extending over and conjointly supported by said pins.

21. The apparatus of claim 20, each flange of one beam forming a pair with a confronting flange of the next adjacent beam, each said pair of flanges supporting a multiplicity of said pins in parallel spaced relation therealong, said heating means comprising a flexible resistance strip draped over and conjointly supported by said multiplicity of pins, for ready access from below said floor.

* * * * *